United States Patent [19]
Saussard et al.

[11] Patent Number: 5,118,246
[45] Date of Patent: Jun. 2, 1992

[54] ELEVATING TAILGATE FOR VEHICLE AND PROCESS OF HANDLING IT

[76] Inventors: Philippe Saussard, 8, Allee Victor Hugo, Varois et Chaignot Ruffey les Echirey, France, 21490; Pierre E. M. Launay, 20 Bld. de Troyes, Talant, France, 21240

[21] Appl. No.: 498,567

[22] Filed: Mar. 23, 1990

[30] Foreign Application Priority Data
Mar. 24, 1989 [FR] France .................. 89 03914

[51] Int. Cl.⁵ .................................. B60P 1/00
[52] U.S. Cl. .......................................... 414/557
[58] Field of Search .......... 414/545, 556–558, 414/917

[56] References Cited

U.S. PATENT DOCUMENTS

| | | | |
|---|---|---|---|
| 3,842,997 | 10/1974 | Sprikkelman | 414/557 |
| 4,671,387 | 6/1987 | Bourgeois | 414/545 |
| 4,930,973 | 6/1990 | Robinson | 414/557 |

FOREIGN PATENT DOCUMENTS

| | | | |
|---|---|---|---|
| 1057971 | 5/1959 | Fed. Rep. of Germany | 414/557 |
| 2250562 | 10/1972 | Fed. Rep. of Germany | 414/557 |
| 2255609 | 11/1972 | Fed. Rep. of Germany | 414/557 |
| 3105251 | 9/1982 | Fed. Rep. of Germany | 414/557 |
| 640885 | 8/1950 | United Kingdom | 414/557 |
| 1389716 | 4/1975 | United Kingdom | 414/557 |

*Primary Examiner*—Jesûs D. Sotelo
*Attorney, Agent, or Firm*—Darby & Darby

[57] ABSTRACT

An elevating tailgate mechanism including an elongated mounting structure to be mounted on the vehicle, a lift frame having one end coupled to a pivoting mechanism on the vehicle mounting structure which rotates the lift frame relative to the mounting frame and a platform pivotally mounted to the other end of the lift frame to be extended therefrom and folded back over the lift frame, and a member for moving the pivoting mechanism along the length of the mounting structure to extend and retract the lift frame and the platform mounted thereto relative to the mounting structure.

6 Claims, 6 Drawing Sheets

ELEVATING TAILGATE FOR VEHICLE AND PROCESS OF HANDLING IT

BACKGROUND OF THE INVENTION

The present invention relates to a tailgate of the type of those fixed in the back of delivery and/or transportation vehicles for the purpose of facilitating the loading of heavy and/or bulky products, possibly permitting the use of elevating carts for the handling of said products.

Such tailgates are generally formed by a lift frame carried by a beam secured by cheek plates to the body of the vehicle and carrying a platform which often is foldable.

The lift frame is subject to the action of a jack so as to be displaced from a position in which the platform it carries rests on the ground to a position in which said platform is at the level of the floor of the vehicle.

Said jack is secured at one of its ends to the beam and at a point of the lift frame generally close to the attachment of the platform at its other end.

A tilt jack connected to the beam and to the platform permits changing the inclination of the latter so that it will always be horizontal, when loading and unloading, in the course of the displacements between the ground and the floor of the vehicle.

Numerous arrangements have been proposed for positioning such a tailgate under the body of the vehicle when it is not in use, notably when the vehicle moves, or when loading or unloading is to be done without using the tailgate.

Such a position, which we shall call road position, permits retracting said tailgate so that it does not constitute a protruding part dangerous to the safety of other vehicles or of pedestrians. At present, all arrangements that have been adopted are costly as they require the use of at least one additional jack, and some require much available space under the vehicle, while for others it is necessary to adapt a plate extending the body of the vehicle.

The present invention strives to propose a tailgate which can fit under the vehicle, is easy to use, is compact, and compares in price to the conventional tailgates.

SUMMARY OF THE INVENTION

The subject of the invention is a tailgate of the kind comprising a mounting structure attached to the vehicle, a lift frame, and a platform, the latter being movable for rotation on the lift frame under the action of at least one tilt jack, said lift frame being movable for elevation under the action of at least one lifting jack and for translation by corresponding means, characterized in that it includes a translatory member mounted for translational movement relative to the mounting structure, in that the lift frame is rigid and mounted for rotation on the translatory member, and in that the movements of the translatory member are controlled by the lifting jack or jacks and/or the tilting jack or jacks.

As is seen, such a tailgate does not have an additional translational jack, thereby reducing its cost as compared with the tailgates of known type.

The tailgate according to the invention is further distinguished by the following characteristics:

The translational means are preferably cylindrical sleeves, integral with the translatory member, which move in corresponding slides of the mounting structure, equipped with front and rear stops; these means are not limiting and any other equivalent translational means may be provided, for example a tie rod, linkage, etc.

The lift frame is mounted for rotation on yokes mounted on the translatory member.

The mounting structure has at least one fixed rotary support, which may be, for example, a roller.

The device further includes at least one arm, approximately parallel to the arm of the lift frame, called a compression arm, intended on the one hand to maintain the inclination of the platform during the lifting and lowering movements thereof, and on the other hand to absorb the loading stresses.

In a first embodiment, the translation is ensured by the lifting jack. The tilting jack is preferably lodged against the lower face of the platform. According to the invention, the jack is mounted on a tie rod joint in such a way that the jack can bring about a 180° rotation of the platform.

The manipulation of tailgate retraction is carried out as follows:

The front end of the platform is folded up manually;

the tilting jack or jacks are actuated for extension to raise the folded platform and to bring it to bear against the roller;

the action of the tilting jacks is continued, leaving the lifting jack unpressurized, in order to cause the raising of the platform and of its frame by rotation on the bearing point constituted by the roller;

when the lift frame is parallel to the sleeve, the movement of the tilting jack is stopped and the pressure in the tilting jack or jacks is maintained so as to keep the platform in contact on the roller, that is, in folded position and locked relative to the lift frame. The tilting jacks have, in this embodiment, the function of locking or blocking jack.

In this position, the lifting jack or jacks are actuated and ensure the displacement of the translatory member on the structure so as to be positioned under the vehicle. The platform moves horizontally rolling on the roller.

Further according to this first embodiment, the lifting jack is advantageously disposed between the lower part of the structure and the lower first end of the compression arms under these arms so as to sustain the compressive stresses during the loading of the platform and to relieve the stresses sustained by the compression arm or arms.

In a second embodiment, the displacement may be assured by the tilting jack or jacks. These are then mounted on the one hand on the structure and on the other hand on the platform. Retraction here involves folding of the platform, followed by a translation;

The front end of the platform is folded manually;

The platform is raised either with the tilting jack or jacks or manually, to bring it against the roller;

The lifting jack is actuated for extension so as to raise the frame, the tilting jack being unpressurized, the platform continues to bear against the roller and progressively approaches the lift frame. When the jack or jacks are in a position approximately parallel to the sliding sleeves, the lifting is stopped and the platform is locked, folded, onto the lift frame. The locking may be obtained by any known means;

The tilting jack or jacks are then actuated for retraction, the lifting jacks being unpressurized, thereby assuring the displacement of the translatory member, frame and platform on the structure, for being positioned under the vehicle.

It is also possible to actuate the lifting jack instead of the tilting jack to ensure the translation.

This second embodiment has the advantage of using known platforms, independent of the tilting jacks and hence less costly and presenting less risk of breakdown of the hydraulic systems.

BRIEF DESCRIPTION OF THE DRAWINGS

The present invention will be understood better and other characteristics thereof will become evident from the following description of an embodiment of the invention with reference to the drawings in which.

DESCRIPTION OF THE PREFERRED EMBODIMENTS

Figure 1:
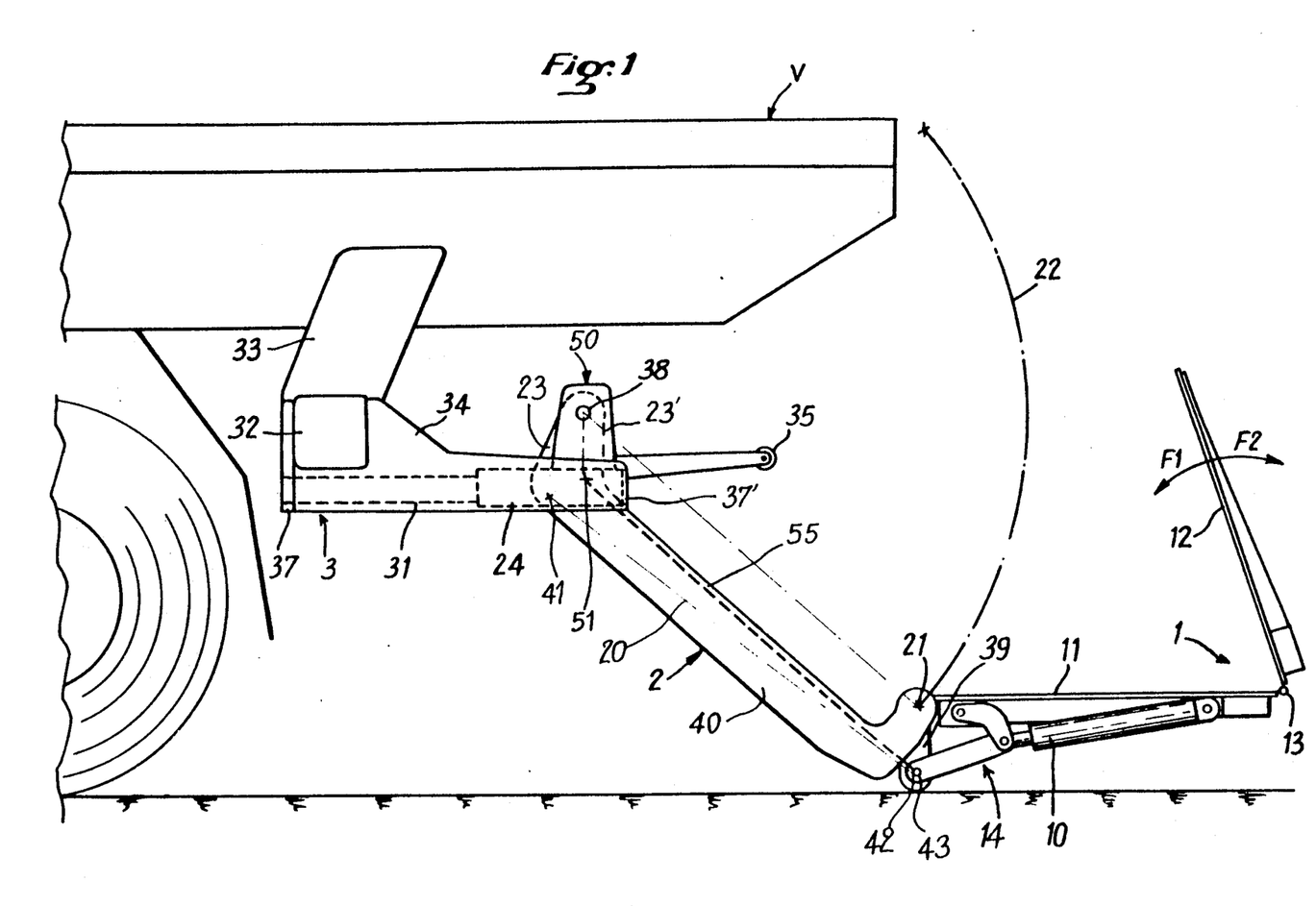
FIGS. 1 to 4 show different positions of the tailgate according to the invention in a first embodiment.

FIG. 1 shows the tailgate in what is called the working position, that is, with the platform resting on the ground.

As is seen, said platform 1 is formed of two parts 11, 12; part 11 is mounted for rotation about an axis 21 on a lift frame 2, while part 12 is mounted for rotation about an axis 13 on part 11.

Usually the rotation in the directions F1 and F2 of part 12 relative to part 11 occurs manually, but a hydraulic jack may be provided to ensure these movements.

When loading or unloading the vehicle V, only the rear of which is indicated schematically, part 12 of platform 1 is flapped down in the direction of arrow F2 until it is in the prolongation of part 11 so as to form a flat platform 1.

In order to transport goods between the ground and the floor of the vehicle V (or vice versa), the platform is raised (or lowered). To this effect, a lifting jack 20, of which only the axis is represented in the figure, ensures the displacement of the end of the lift frame and hence of the axis 21 along the arc of circle 22 represented in dash-dot lines.

The lift frame 2 is rigid; it has tow non-extensible lift arms 40 spaced from each other, intended to raise the platform 1. Lift arms 40 are connected in known manner by two crosspieces 53, 54 ensuring the rigidity of the frame. Frame 2 is curved upward at its two ends; toward the front (left side of FIG. 1) each arm 40 ends in a flat cheek 23 intended to swivel on corresponding yokes 23' of a translatory member 50. In the back (right side of FIG. 1), the other upper end hinges at 21 on a yoke 39 carrying the platform 1.

The translatory member 50 is, according to the invention, a member whose function is one the one hand to carry the lift frame 2, on the other hand to ensure the translation of the frame 2 relative to the chassis of the vehicle V. To this effect the translatory member 50 has a rigid beam, transverse to the direction of displacement of the vehicle, on which are mounted the two articulation yokes 23' of frame 2 and two cylindrical and parallel sleeves 24, intended to ensure the guides displacement of the translatory member and consequently of the entire tailgate, relative to the mounting structure 3.

The structure 3 for mounting the tailgate on the vehicle V includes a beam 32 attached to said vehicle and extending transversely to the direction of displacement of the vehicle over approximately the total width of the vehicle. This beam is carried by two flanges 33 fixed on the chassis of the vehicle. The beam 32 carries two other flanges 34 supporting the slides 31 that receive the sleeves 24 of the translatory member 50.

Front and back stops 37, 37' are located at the ends of the slides 31. As shown in the drawing, when the tailgate is used, the sleeves 24 bear against the rear stops 37'.

Further the tailgate according to the invention has a support means 35 carried by the mounting structure 31 on its rear end, spaced from the stops 37'. This support means 35 ensures the following functions:

(1) It serves to receive the platform 1 during the closing operation. The platform comes to bear against this fixed point, thereby enabling the frame 2 to rise and to complete the closing.

(2) During the displacement (retraction or extension) of the translatory member 50, the support means 35 holds the platform 1 and the frame 2 in a horizontal position. The platform moves relative to this support means 35. To this effect, a roller, of rubber or the like, is advantageously used.

The mounting structure 3 is thus fixed on the vehicle, and the translatory member 50 reciprocates front to back and vice versa by displacement of the sleeves 24 on the slides 31.

The lifting jack 20 is mounted at one of its ends on the mounting structure 3 at 41, and at the other end, on the axle 42 of the yoke 39 carrying the platform 1.

According to the invention, there is provided further at least one rigid, inextensible compression arm 55, substantially parallel to the arms 40 of the lift frame 2, mounted at one end 51 on the translatory member 50 and at its other end 43 on the yoke 39. This arm serves on the one hand, to maintain the inclination of the platform during its up and down movements, and on the other, to support the load placed on the platform; for this reason it is called a compression arm. In the example of FIGS. 1-4, two compression arms 55 are provided, shown dashed in the drawing.

The locations of the axes of articulation 21, 38 of the frame 2, and axes 51 and 43 of the compression arms are chosen so as to define a deformable parallelogram (a pantographic construction) which keeps the inclination of the platform 1 constant relative to the horizontal, and hence general horizontal, during the raising and lowering of the platform.

The inclination of platform 1 is controlled by the tilting jack 10. In the embodiment shown in FIGS. 1 to 4, the jack 10 is mounted on the lower face of the platform and is mounted at one end to the platform 1 and on the other end at the axis 43 on the yoke 39. In the embodiment of FIGS. 1-5, the axis 43 and the axis 42 are coaxial.

According to the invention, on the side of yoke 39, a link joint 14 is provided, permitting a 180° inclination of the platform in order to obtain the complete closing of the platform on frame 2 by jack 10.

For a given extension of the lifting jack 20, and with its end 42, the yoke 39 and also the axle 43 of the tilting jack 10; stationary, the extension or retraction of the tilting jack 10 produces the rotation of the platform about the axis 21.

Figure 4:
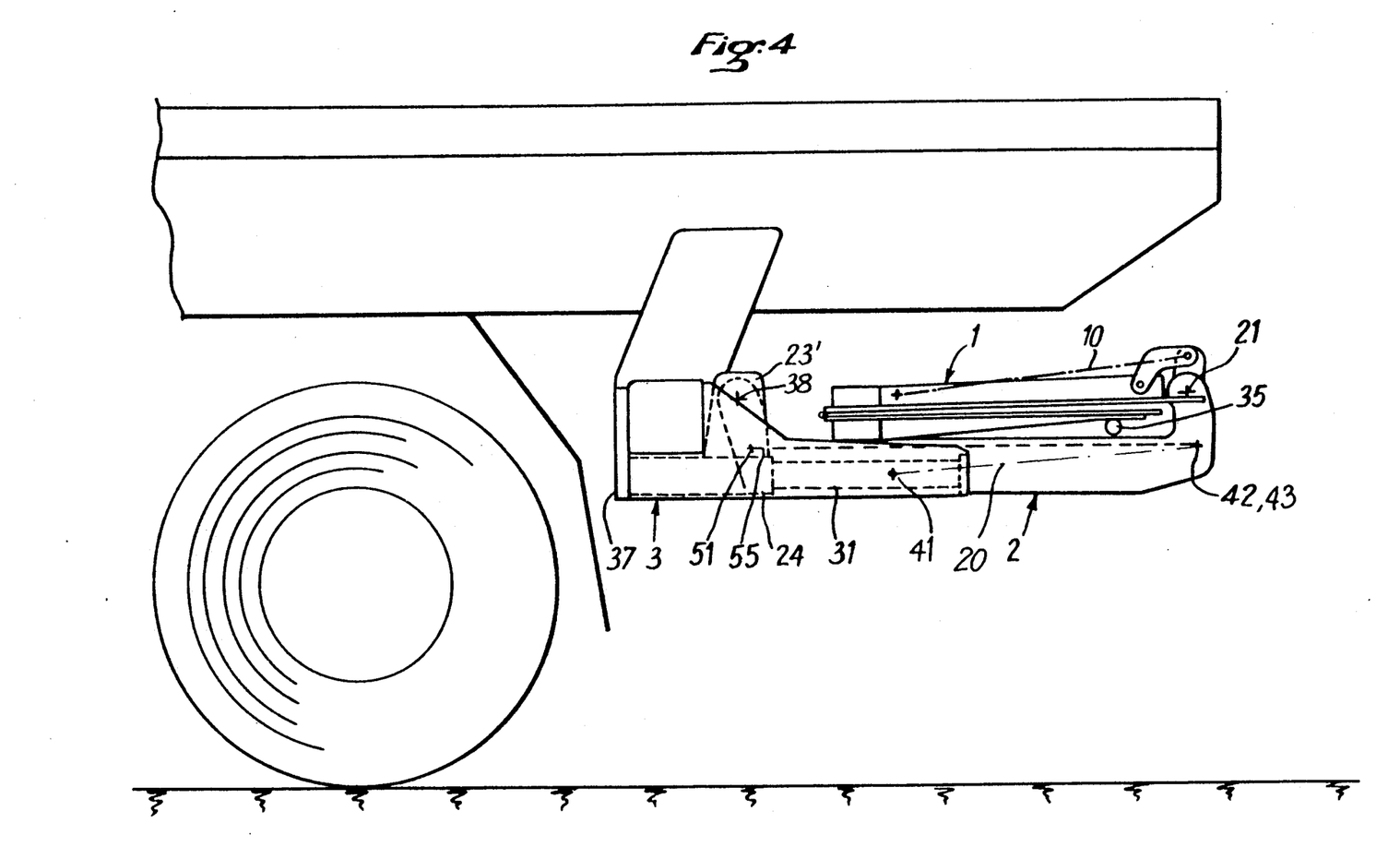
Figure 5:
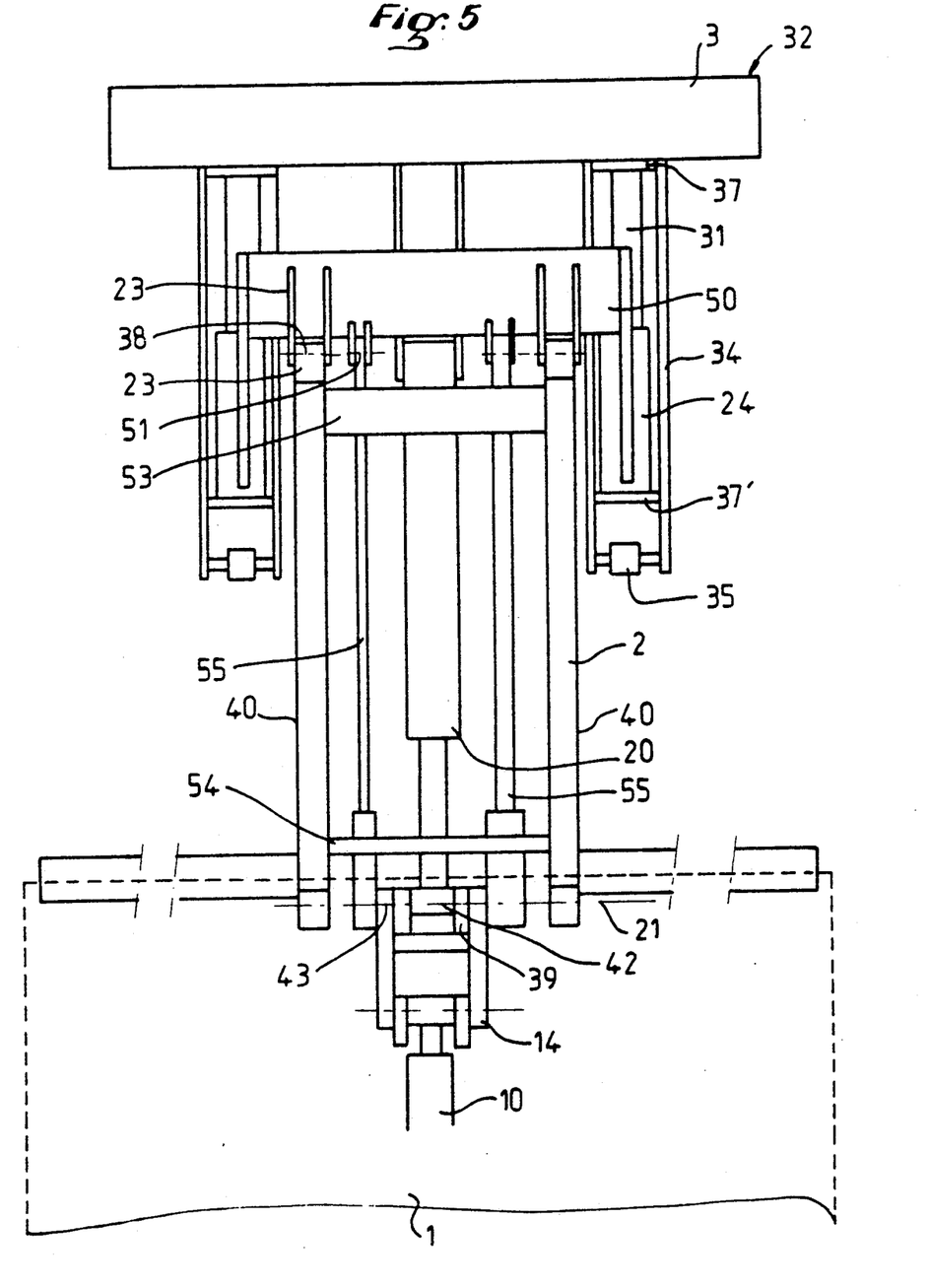
FIG. 5 is a partial schematic view of the first embodiment of the tailgate according to the invention.

The operation of the tailgate according to this first embodiment is the following:

When the tailgate is to be brought from the so-called working position shown in FIG. 1 to the so-called road position shown in FIG. 4, in which it is positioned entirely under the vehicle, first of all fluid is sent into the tilting jack 10 to cause it to extend.

The lengthening of jack 10 produces the rotation of the platform 1 previously folded over on itself (F1) in the sense tending to make it approach the lift frame 2.

This operation is carried out until part 12 of platform 1 is in contact with the lift frame 2, that is, in a substantially horizontal position or, more precisely, in a position where the lifting jack 20 is approximately parallel to the sliding sleeves 24.

The operation can be broken down into two stages: a first stage wherein the tilting jack 10 causes rotation of the platform, which comes in contact with the roller(s) 35 (FIG. 2); a second stage wherein the tilting jack 10 pursues its effort of lengthening. As the platform rests on a fixed point, the coming together of the platform 1 and of the lift frame 2 is realized necessarily by raising of the lift frame 2 (FIG. 3).

Figure 2:
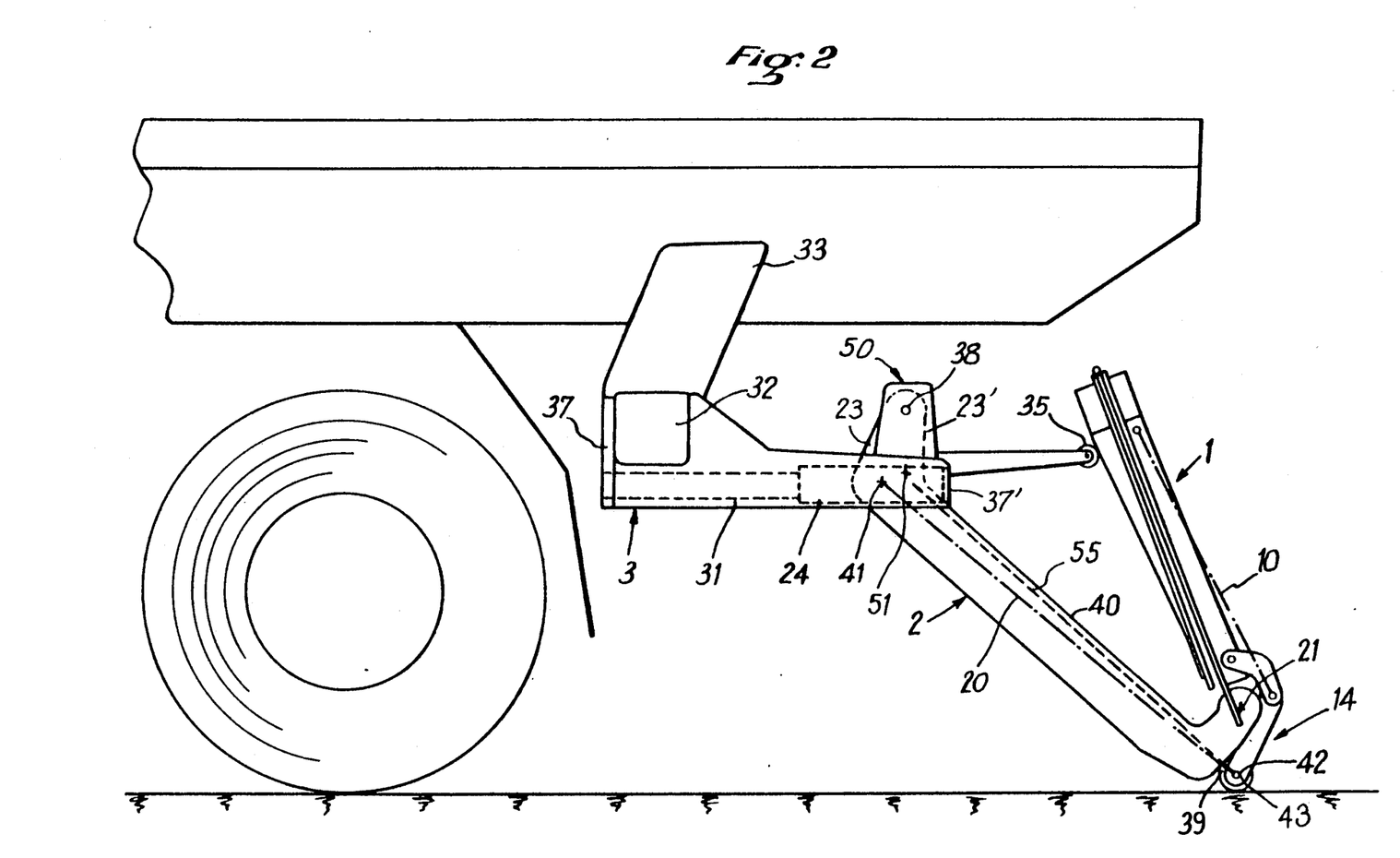
Figure 3:
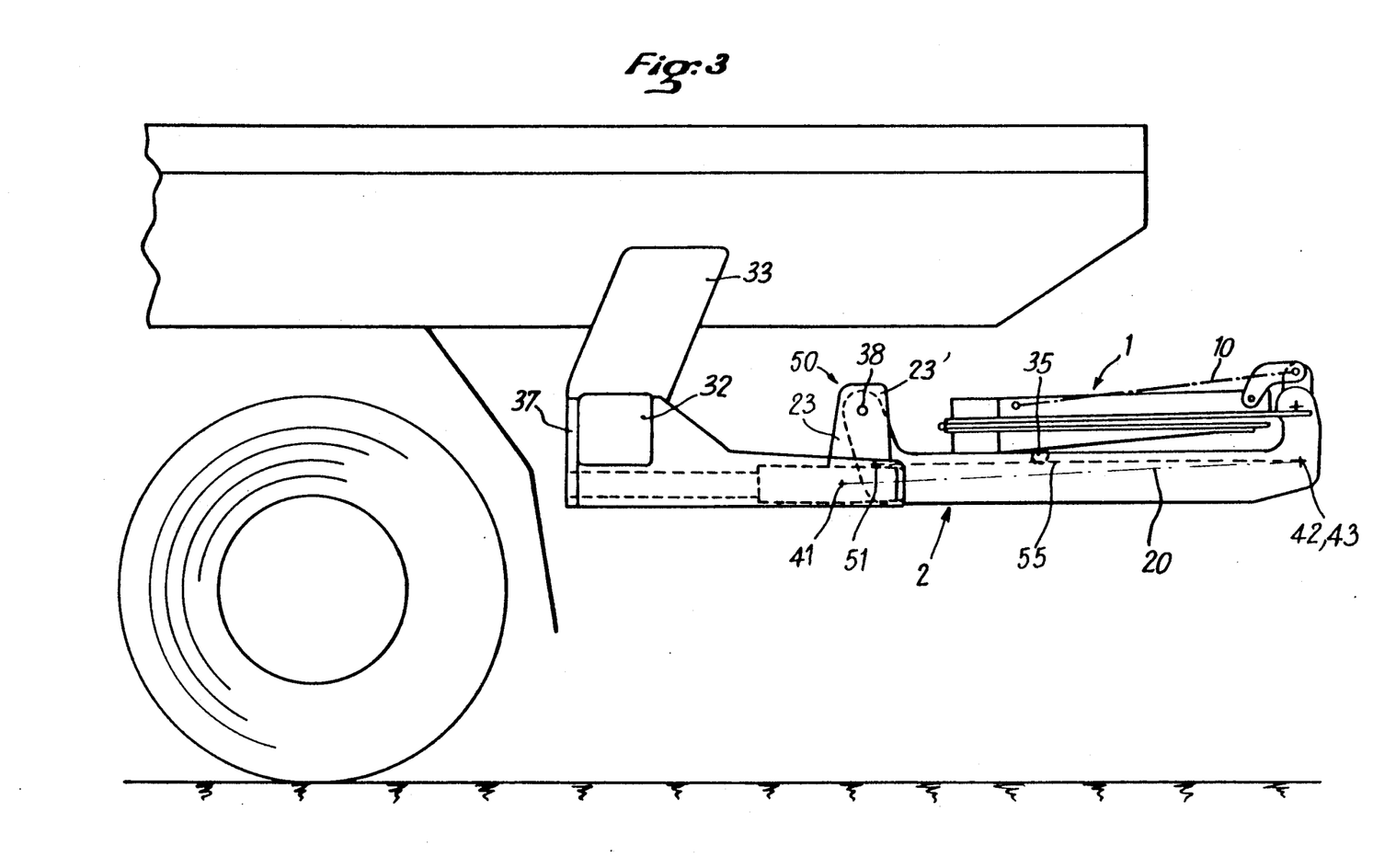

During this entire operation of FIGS. 1, 2 and 3, the lifting jack is free (not pressurized) in order not to oppose the raising of frame 2.

From this position on, the lifting jack 20 is made to retract in order to produce the sliding of the sleeves 24 on the slides 31 until they abut on the front stops 37. To this end a double-action jack is preferably used.

During this sliding operation, the platform is held against the lift frame 2 by locking. This locking is obtained by maintaining the pressure in the tilting jack 10, or by any mechanical locking of known type. During this operation also, the platform moves as it rolls on the support roller 35.

In this position shown in FIG. 4, the tailgate is in the road position and the vehicle can move, the tailgate presenting no risks for other travelers.

Bringing the tailgate into working position is done in that the lifting jack 20 is made to extend until the sleeves 24 abut on the rear stops 37'. It then suffices to make the tilting jack 10 retract, the lifting jack 20 being released of pressure for the tailgate to assume the position of FIG. 2. In retracting the tilting jack 10, the platform opens and the tailgate is brought into working position.

As this description has shown, the tailgate according to the invention does not require the use of a supplementary jack for its retraction beneath the vehicle; the latter is ensured by the lifting jack 20.

Figure 6:
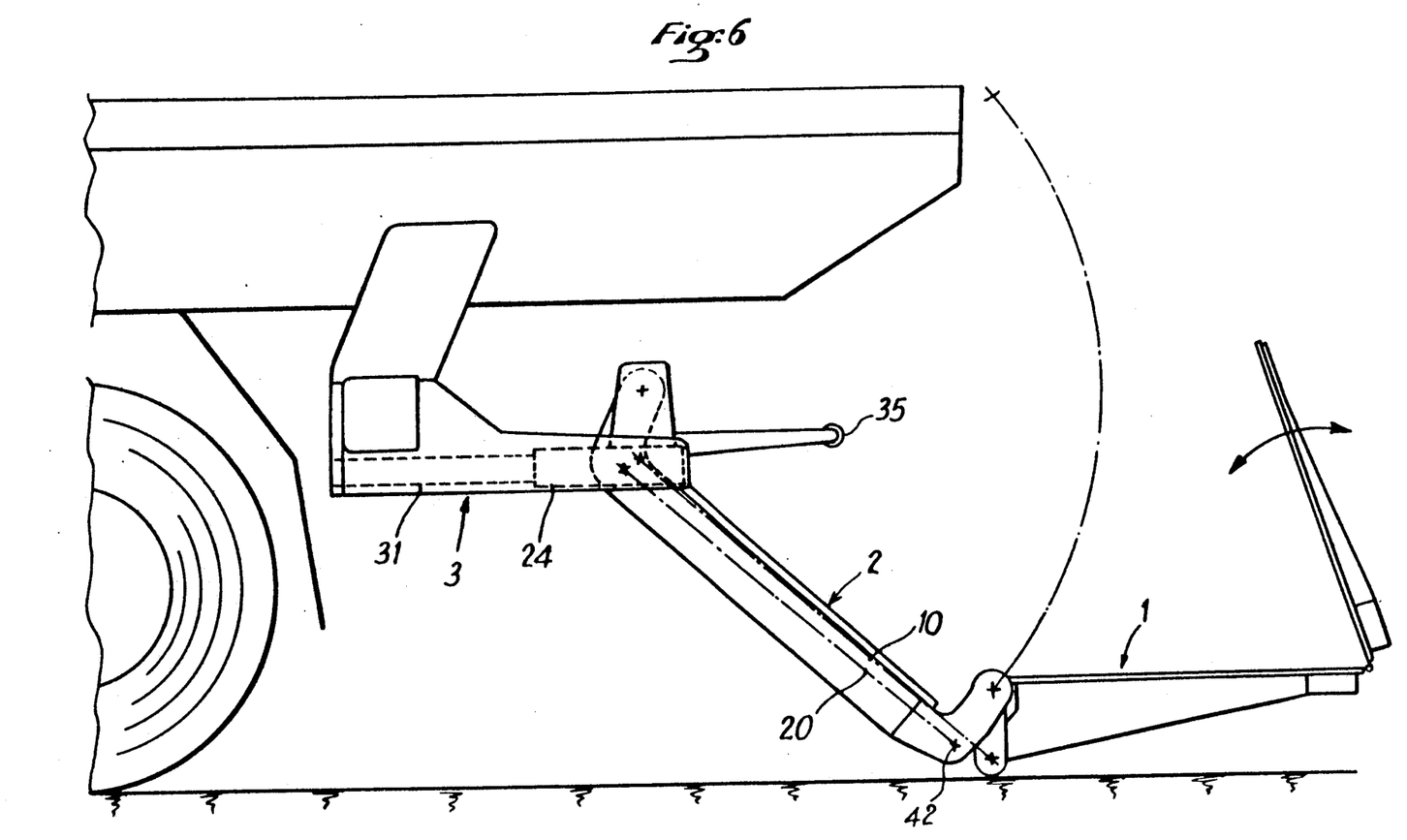
FIG. 6 shows an alternative embodiment of the tailgate according to the invention.

FIG. 6 shows an alternative embodiment of the tailgate according to the invention in which it is the tilting jack that ensures or can ensure the displacement of the translatory member 50.

To this effect, the tilting jack 10, or jacks are placed between the mounting structure 3 and the platform 1, while the lifting jack or jacks 20 are placed between the translatory member or the mounting structure and the lift frame 2, the joints 42 and 43 being separate. In this variant, the compression arms are omitted.

The deployment of the tailgate takes place in three stages:

(1) Extension of the tilting jack 10, the lifting jack 20 being smooth (sic) up to the stop 37';
(1) Retraction of the lifting jack 20—as the tilting jack 10 is free by its own weight, the platform deploys (FIG. 2).
(3) Retraction of the tilting jack 10 (FIG. 1).

The folding takes place substantially in the reverse sense:

(1) Manual folding in direction F1 of the platform 12 on 11;
(2) Extension of the tilting jack 10. When the jack 10 is extended to the maximum, the movement of rotation of the platform is pursued manually until abutment against the roller 35 (FIG. 2);
(3) Raising of frame 2 by extension of the lifting jack, to the horizontal position, the tilting jack being free;
(4) Manual locking of the platform 1 on the lift frame 2;
(5) Retraction of the tilting jack 10, displacement of the slide-block on the slides 31.

We claim:

1. An elevating tailgate for a vehicle having a front end and a rear end comprising:

a mounting structure connected at the rear end of said vehicle;

a translation member having a connection to said mounting structure for translational motion relative to said mounting structure, selectively in a translational direction toward or away from said rear end, said connection including a sliding means on said translation member for sliding engagement with a fixed element provided on said mounting structure, said connection guiding said translational motion in said translational directions;

a rigid lift frame having a first end and a second end, said first end being pivotably connected to said translation member for selective translational motion therewith, and for rotation relative thereto;

a platform having a front end and a rear end, the front end of said platform being pivotably connected to said second end of said lift frame;

a tilting jack having a first extension member, said tilting jack being connected between said lift frame and platform, extension and retraction of said first extension member causing said platform to pivot in opposite directions respectively, about said lift frame;

a lifting jack having a second extension member, said lifting jack being connected to said lift frame, extension and retraction of said second extension member causing said lift frame to pivot in opposite directions, respectively relative to said translation member, said platform being selectively raised or lowered relative to said vehicle; and said platform, lift frame and mounting structure being dimensioned to enable said tilting jack, when actuated, to bring said platform and lift frame into substantially parallel alignment with said translational directions, said platform being enabled to move in said translational directions by activation of said lifting jack when said lift frame and jack are in said alignment.

2. An elevating tailgate as in claim 1, wherein said sliding means includes sleeves, and said fixed element on said mounting structure includes slides, said sleeves at least partially enclosing said slides with sliding contact therebetween, and further comprising a front stop and a rear stop connected to said mounting structure, said stops limiting motion of said translation member relative to said mounting structure in said translational directions.

3. An elevating tailgate as in claim 1, and further comprising a yoke fixedly connected to said translation member, said lift frame being connected to said translation member at said yoke at a pivot axis spaced from said connection to said mounting structure for translational motion.

4. An elevating tailgate as in claim 1, and further comprising at least one support member connected to said mounting structure and extending generally in said translational direction toward the rear of said vehicle, said support member being positioned to contact said platform while said tilting jack moves said platform and lift frame into said substantially parallel alignment, said support member including roller means for providing rolling contact between said support member and said platform.

5. An elevating tailgate as in claim 1, and further comprising a first link pivotably connected to a front end of said platform and to a second end of said lift frame, said lifting jack having two ends and being connected at one end to said mounting structure at the other end to said first link, said tilting jack being connected at one end to said first link and at the other end on a lower face of said platform.

6. An elevating tailgate as in claim 5, and further comprising a link joint, said link joint being positioned between said one end of said tilting jack and said first link, said first link and said link joint in combination enabling folding of said platform relative to said lift frame through an angle in the order of 180 degrees, said platform being able to fold over onto said lift frame to produce said generally parallel alignment.

* * * * *